United States Patent
Gilchrist et al.

(10) Patent No.: US 7,042,855 B1
(45) Date of Patent: May 9, 2006

(54) METHOD FOR ROUTING DATA IN A COMMUNICATION SYSTEM

(75) Inventors: Philip Gilchrist, Palatine, IL (US); Sanjay Gupta, Chicago, IL (US); Gregory C. Ladden, Vernon Hills, IL (US); Stephen Spear, Skokie, IL (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/513,043

(22) Filed: Feb. 25, 2000

Related U.S. Application Data

(63) Continuation-in-part of application No. 09/050,240, filed on Mar. 30, 1998, now abandoned.

(51) Int. Cl.
*H04Q 7/00* (2006.01)

(52) U.S. Cl. ............. 370/328; 370/338; 370/401; 455/432.1

(58) Field of Classification Search ........... 370/338, 370/401, 328, 522, 356; 455/432.1, 432.3, 455/445
See application file for complete search history.

(56) References Cited

U.S. PATENT DOCUMENTS

| | | | |
|---|---|---|---|
| 5,159,592 A * | 10/1992 | Perkins ............. | 370/338 |
| 5,206,856 A | 4/1993 | Chung | |
| 5,420,853 A | 5/1995 | McRoberts et al. | |
| 5,442,633 A * | 8/1995 | Perkins et al. ....... | 370/331 |
| 5,504,804 A | 4/1996 | Widmark et al. | |
| 5,708,655 A * | 1/1998 | Toth et al. .......... | 370/313 |
| 5,719,860 A * | 2/1998 | Maison et al. ........ | 370/347 |
| 5,752,193 A * | 5/1998 | Scholefield et al. ... | 455/452.2 |
| 5,761,195 A * | 6/1998 | Lu et al. ........... | 370/329 |
| 5,930,715 A * | 7/1999 | Chambers ........... | 455/445 |
| 6,044,267 A * | 3/2000 | Foladare et al. ..... | 455/426.1 |
| 6,052,369 A * | 4/2000 | Hamalainen et al. ... | 370/389 |
| 6,104,929 A * | 8/2000 | Josse et al. ........ | 455/445 |
| 6,138,022 A * | 10/2000 | Strawczynski et al. .. | 455/445 |
| 6,185,198 B1 * | 2/2001 | LaDue .............. | 370/329 |
| 6,463,055 B1 * | 10/2002 | Lupien et al. ....... | 370/353 |
| 6,512,756 B1 * | 1/2003 | Mustajarvi et al. ... | 370/341 |
| 6,515,989 B1 * | 2/2003 | Ronneke ............ | 370/389 |

* cited by examiner

*Primary Examiner*—Ricky Q. Ngo
*Assistant Examiner*—Nguyen H. Ngo
(74) *Attorney, Agent, or Firm*—Kenneth A. Haas; Jeffrey K. Jacobs

(57) ABSTRACT

The present invention provides a method for routing data from a service request in a communication system. A context is transferred from a packet data gateway, such as a Serving GPRS (GSM Packet Radio Service) Support Node (SGSN), to a Base Station System (BSS) coupled thereto. The context specifies where data for this user should be sent. The service request is received at the BSS and includes data. The data from the service request is routed to an appropriate location, based at least in part upon the context.

11 Claims, 6 Drawing Sheets

| | |
|---|---|
| 901 — | IMSI |
| | MM STATE — 951 |
| 952 — | VRL ADDRESS |
| | NEW SGSN ADDRESS — 953 |
| 902 — | TLLI |
| | ROUTING AREA — 954 |
| 903 — | CELL IDENTITY |
| | AUTHENTICATION TRIPLETS — 904 |
| 905 — | Kc |
| | CKSN — 906 |
| 907 — | CIPHERING ALGORITHM |
| | MS CLASS — 908 |
| 909 — | CLASSMARK |
| | DRX PARAMETERS — 910 |
| 911 — | COMPRESSION |
| | MNRF — 955 |
| 956 — | RECOVERY |
| 912 — | PDP TYPE |
| | PDP ADDRESS — 913 |
| 914 — | NSAPI |
| | PDP STATE — 915 |
| 916 — | GGSN ADDRESS |
| | GGNS ADDRESS IN USE — 917 |
| 957 — | DYNAMIC ADDRESS ALLOWED |
| | VPLMN ADDRESS ALLOWED — 958 |
| 918 — | QoS SUBSCRIBED |
| | QoS REQUESTED — 919 |
| 920 — | QoS NEGOTIATED |
| | SND — 921 |
| 922 — | SNU |
| | REORDERING REQUIRED — 923 |

900 brackets the lower group (912–923).

*FIG. 9*

METHOD FOR ROUTING DATA IN A COMMUNICATION SYSTEM

REFERENCE TO RELATED APPLICATION

As a continuation-in-part, this application claims priority from U.S. patent application Ser. No. 09/050,240, filed Mar. 30, 1998, now abandoned.

FIELD OF THE INVENTION

The present invention relates generally to communication systems, and more particularly to a method for routing data in a communication system.

BACKGROUND OF THE INVENTION

Typical corporate communication systems include a wire line networking infrastructure and an in-building wireless infrastructure. The wire line networking infrastructure is typically packet switched. One example of a corporate communication system is a Group Special Mobile (GSM)/ GSM Packet Radio Service (GPRS) network. A packet cellular network infrastructure consists of a Base Station System (BSS) and GPRS Packet Support Nodes (PSN). Currently, a service request is placed at the PSN by a mobile station. Thereafter, the BSS receives data from the service request from the MS and forwards it to the Serving GPRS Support Node (SGSN). The SGSN routes the data towards the destination.

Similarly, the PSN forwards any data received for a mobile station to the BSS. The BSS sends the data to the mobile station. Data from a service request between a mobile station and a fixed station, irrespective of their relative locations, is routed via the BSS, the PSN, and one or more wire line gateways. A similar procedure is used to route data between mobile stations.

This system satisfies the need for wireless telephony and wireless data services. In this system, traffic between mobile stations, such as cellular telephones, and wire line hosts belonging to the same corporate or in-building environment is routed through the corporate gateway, one or more GPRS Serving Nodes (GSNs), and the BSS Packet Control Unit (PCU). This routing, however, does lead to increases in end-to-end delays and packet loss and can lead to poor utilization of expensive transmission resources.

For mobile station-originated data packets in a standardized GPRS system, the BSS does not know the destination of the data packets or the ciphering keys required to decrypt the data contained in the packets. The BSS does not typically know the Temporary Logical Link Identifier (TLLI) to Packet Data Protocol (PDP) address mapping, such as the IP address or X.25 address. In other words, the BSS does not have any routing information to route the data packets.

The current approach for handling Circuit Switched data for in-building applications is to use the GSM recommendations as is, with no special Local Routing capabilities. Consequently, an in-building Circuit Switched data call will be routed up to the MSC and use its Inter Working Function (IWF). Unless special trunk provisioning is performed at the MSC, the Circuit Switched data call will be routed through the PSTN to the in-building PBX for connection to a wired Circuit Switched modem or fax modem. This leads to unnecessary transmissions of data, which in turn leads to delays in reception and inefficient utilization of resources.

Consequently, a need exists for a method for routing data in a communication system that does not increase delays and that fits seamlessly into current communication systems.

BRIEF DESCRIPTION OF THE DRAWINGS

FIG. 9 depicts a table that includes the contexts maintained by the packet data gateway and the BSS in accordance with the preferred embodiment of the present invention.

DETAILED DESCRIPTION OF A PREFERRED EMBODIMENT

The present invention provides a method for routing data in a communication system. The present invention preferably routes user traffic that originates from a GPRS mobile station (first remote unit), to a second remote unit existing on the same local wire line network. The present invention additionally routes user traffic that is destined from the hosts on the corporate wire line network to the GPRS Mobile Station without the data traffic leaving the local network.

In the preferred embodiment of the present invention local routing refers to the routing of data traffic at the Base Transceiver Station (BTS) level or at the Base Station Controller (BSC) level of the communication system hierarchy.

The data traffic can include voice as well as data. In local routing, the routing of user traffic is separated from the call control, which can involve the Mobile Switching Center (MSC) and Serving GPRS Support Node (SGSN) as defined in the GSM standards. Local routing is achieved by the separation of control and traffic handling procedures.

The present invention encompasses a method for routing data in a communication system. The method comprises the steps of determining that a first remote unit needs to communicate with a second remote unit. In the preferred embodiment of the present invention the first remote unit is a mobile unit part of a local network. An availability of the second remote unit within the local network is determined. A routing function is transferred from a packet data gateway to a Base Station System (BSS), based on the determination that the second remote unit is within the local network, and data is routed from the first remote unit to the second remote unit via the BSS without routing the data through the packet data gateway.

Figure 1:
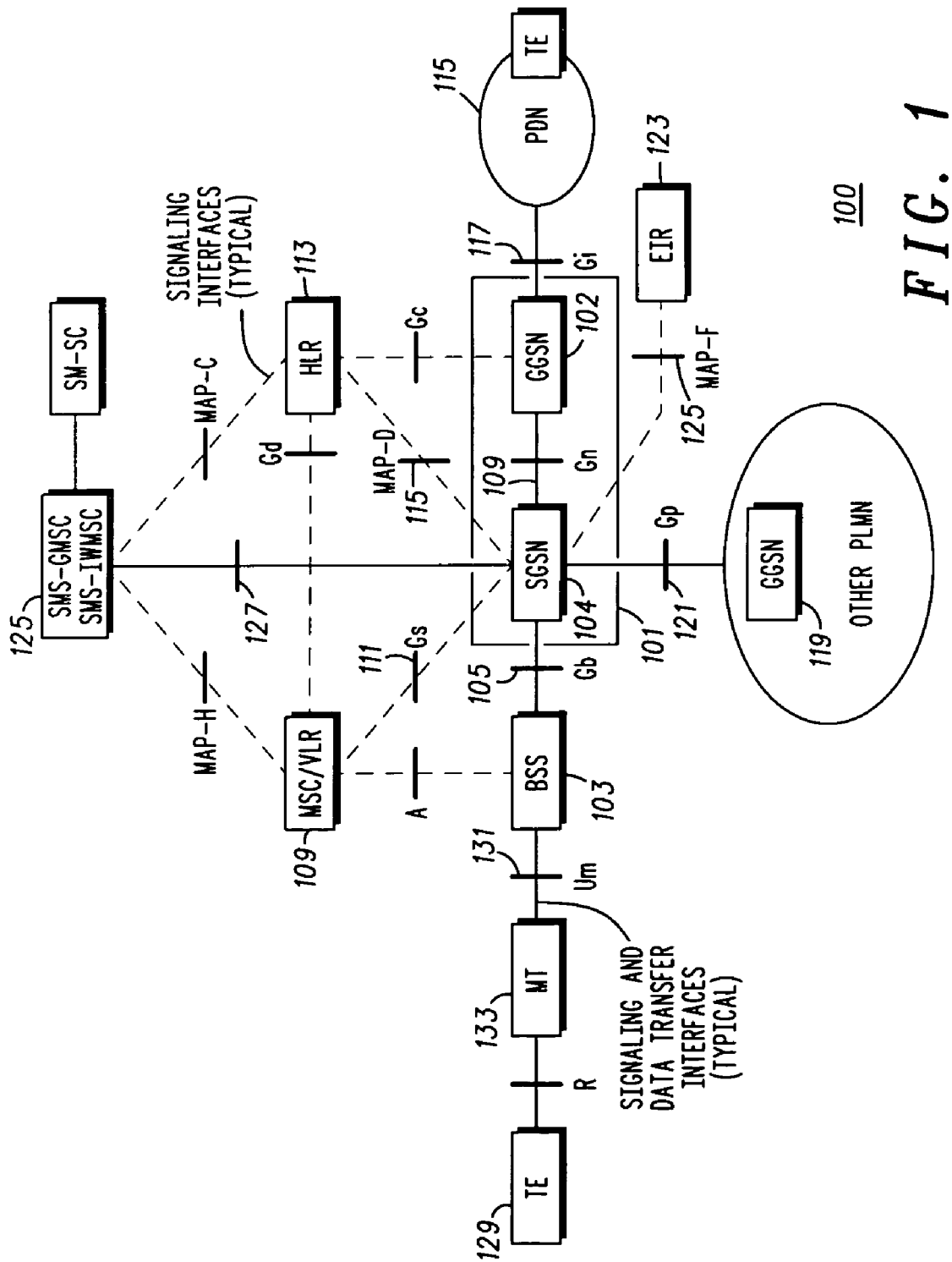
FIG. 1 depicts a GPRS network in accordance with the preferred embodiment of the present invention.

Turning now to the drawings, wherein like numerals designate like components, FIG. 1 shows the architecture of a GSM Packet Radio Service (GPRS) network 100 and the defined interfaces. GPRS network 100 includes a new functional element, the GPRS Serving Node (GSN) 101 that includes a GGSN 102 and an SGSN 104. GSN 101 provides a high-speed packet-switched platform, which supports GSM related mobility management. GSN 101 communicates with Base Station System (BSS) 103 via a standardized Gb interface 105. Gb interface 105 provides access rates per user from zero to the maximum possible bandwidth. The maximum possible bandwidth is currently between about 2048 kbit/s, offered by G.704, to about 53 Mbit/s, offered by a High Speed Serial Interface (HSSI). In the preferred embodiment, a "transport bit pipe" is provided by Frame Relay over the Gb interface. In an alternate embodiment of the present invention, commonly referred to as Universal Mobile Telecommunications System (UMTS) phase 1, Asynchronous Transfer Mode (ATM) may replace Frame Relay without effecting higher layer protocols used over the Gb interface. All user data and control information between BSS 103 and SGSN 101 are transported over Gb interface 105.

SGSN 104 is coupled to BSS 103 via Gb interface 105. SGSN 104 interacts with GGSN 102 via Gn interface 107. SGSN 104 interacts with MSC/VLR 109 via Gs interface 111. SGSN 104 interacts with HLR 113 via Gr interface 115. GGSN 102 interacts with external packet data networks 115 via Gi interface 117. SGSN 104 interacts with other PLMN and GGSNs 119 via Gp interface 121.

SGSN 104 interacts with an Equipment Identity Register (EIR) 123 via MAP-F 125. SGSN 104 interacts with Short Message Service-Gateway MSC (SMS-GMSC) and Short Message Service-InterWorking MSC (SMS-IWMSC) 125 via Gd interface 127.

Terminal (remote unit) 129 is terminal equipment, such as a computer that is interconnected with a second remote unit (mobile unit), such as a cellular phone that includes a Subscriber Identity Module (SIM) card or the like. Um 131 is the air interface between mobile station 133 and BSS 103.

Figure 2:
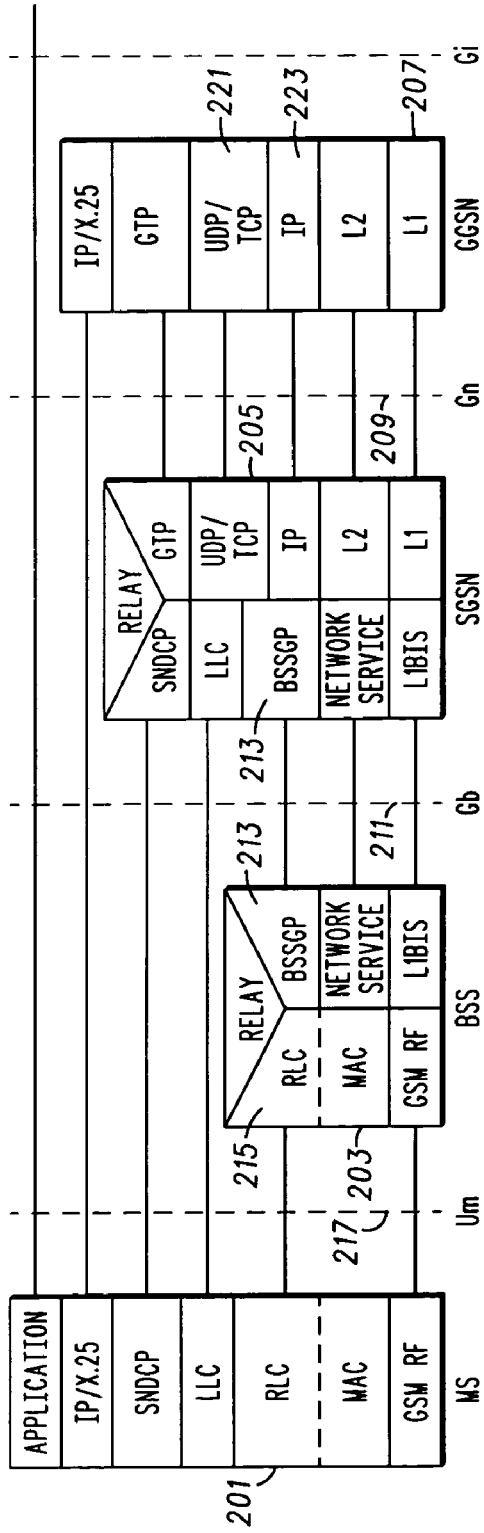
FIG. 2 depicts a layered transmission protocol architecture of a GPRS network in accordance with the preferred embodiment of the present invention.

FIG. 2 shows the layered transmission protocol architecture for GPRS Network 100. In order for a mobile station 201 to communicate via GPRS network 100, mobile station 201 must first attach to GPRS network 100. Mobile station 201 accomplishes this by issuing a GPRS location update to SGSN 205, causing SGSN 205 to interrogate the Home Location Register (HLR) to obtain the record associated with mobile station 201. For clarity, only an empty SGSN/VLR is described herein. It should be readily understood that the present invention also applies to SGSN/VLRs that contain user records. Further, interrogation of the HLR may be avoided if the SGSN 205 has stored the Mobility Management context of mobile station 201. GPRS authentication and cipher key allocation or reallocation may then occur between SGSN 205 and mobile station 201.

If the GPRS location update is successful, mobile station 201 may then set up routing contexts for a number of Packet Data Protocol (PDP) addresses. This is accomplished by issuing a PDP context activation request by mobile station 201 to SGSN 205. The PDP context activation request preferably includes an IP address and the QoS Profile associated with the IP address. In an alternate embodiment, the PDP context is dynamically allocated and the activation request does not include a PDP address.

As used herein, a context refers to mobility and security information that relates to a remote unit or a remote user, and allows for routing of the remote unit's traffic. The context also includes information relating to a service request for a remote unit, such as access rates. The context is utilized to process and route data to and from a remote unit.

SGSN 205 analyzes the contents of the request and sets up a routing context 209 between SGSN 205 and GGSN 207. SGSN 205 then holds, and relates, two routing contexts. The first routing context is an MS-to-SGSN routing context. The second routing context is an SGSN-to-GGSN routing context. Mobile station 201 or a remote host may then communicate via GPRS.

When a packet destined for mobile station 201 arrives at GGSN 207, GGSN 207 extracts the destination address of the packet. GGSN 207 then checks the stored MS-to-PDP routing contexts to determine if a match can be found between the stored contexts and the destination address of the packet. If a match is not found, the incoming packet is preferably discarded. Alternately, the incoming packet can be returned to the originator of the packet. If a match is found, the incoming packet is wholly encapsulated in the GPRS Tunneling Protocol (GTP-GSM 09.60). The GTP PDU is transported via User Datagram Protocol (UDP) or Transport Control Protocol (TCP) 221 over Internet Protocol (IP) 223 to SGSN 205. SGSN 205 examines the GTP header and locates the corresponding MS-to-SGSN routing context. Based on the mobility management state of mobile station 201, SGSN 205 will preferably send the packet directly to mobile station 201 via the SNDCP/LLC functions when the location of mobile station 201 is known to the cell-level. Alternately, SGSN 205 will page mobile station 201 when the location of mobile station 201 is known only to the routing area level.

In the alternate embodiment, the transmission of the encapsulated packet is delayed until mobile station 201 responds with a paging response indicating the cell-level location of mobile station 201. The packet is then transferred across the Gb-interface 211 using the BSSGP 213 over Frame Relay to the RLC/MAC entity 215, located in BSS 203, and subsequently across Um air-interface 217 to mobile station 201.

Mobile station 201 desiring to transmit data via the GPRS network places a service request to SGSN 205. SGSN 205 enables mobile station 201 to transmit data after authenticating mobile station 201 and activating the service request at GGSN 207. Prior to data transmission to mobile station 201, GGSN 207 activates a service request. GGSN 207 will initiate the paging of mobile station 201 if mobile station 201 is not currently communicating with an SGSN. GGSN 207 then sends a notification to SGSN 205, which activates a service request for mobile station 201. In this manner, SGSN 205, GGSN 207, and mobile station 201 all have the proper service request activation prior to data transmission.

Figure 3:
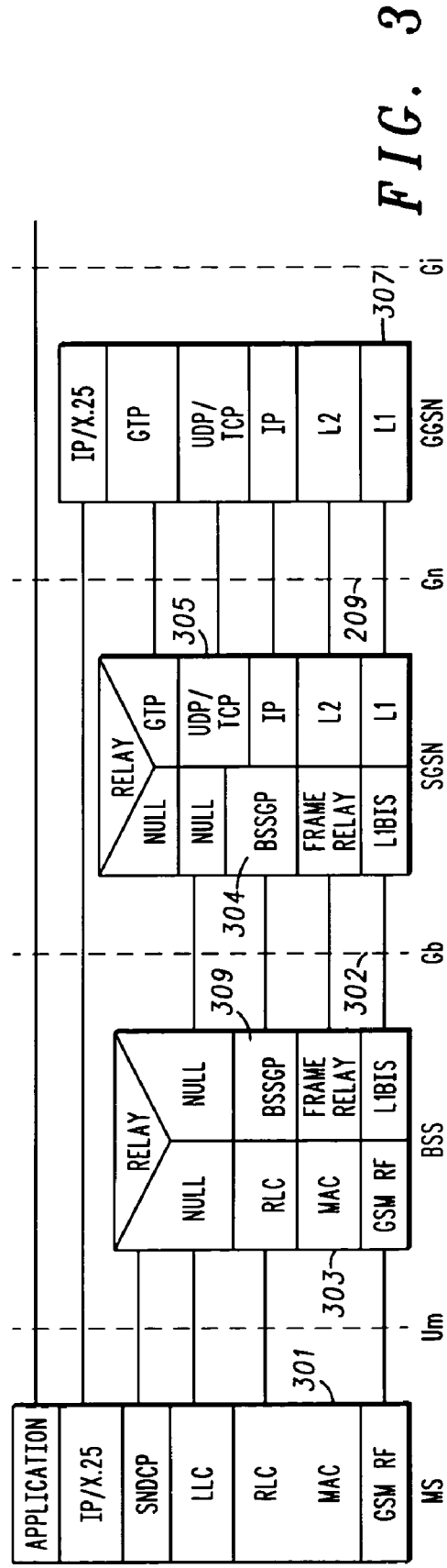
FIG. 3 depicts a protocol stack for local mobile station to non-local station communication in accordance with the preferred embodiment of the present invention.

FIG. 3 depicts a protocol stack for local mobile station to a local wire line station communication. A determination is made that a first remote unit needs to communicate with a second remote unit when an attach request is received from mobile station 301. SGSN 305 determines if local routing is possible (i.e., whether the second remote unit is within the local network) and transfers to BSS 303 the contexts (routing information) related to mobile station 301 if local routing is possible. The determination of local routing at the BSS can be determined based on the identity of both the first and second remote units in the local routing area. Routing functionality is transferred from the packet data gateway to BSS 303 if local routing is possible. In order to transfer the context (routing information), an additional signaling path between SGSN 305 and BSS 303 must be established to communicate to SGSN 305 the required contexts associated with mobile station 301. A signaling pipe between BSS 303 and SGSN 305 is preferably configured by configuring a frame relay permanent virtual circuit. This approach does not involve any changes to standardized Gb interface 302. In an alternate embodiment, a signaling pipe between BSS 303 and SGSN 305 is configured using a bit in BSSGP protocol header 304 to indicate that the PDU is carrying signaling information.

SGSN 305 may refresh the context of mobile station 301 in BSS 303 when a parameter is changed due to mobile station-to-SGSN L3MM signaling. SGSN 305 authorizes BSS 303 to process PDUs on its behalf. Similar procedures are invoked after every change or creation of a new context in the mobility management of mobile station 301 at SGSN 305. One such example is a change in the BSS serving the mobile station. The same signaling pipe is used to perform these functions.

Once the BSS receives routing information for a particular call, all uplink end-user information received for the call is routed (utilizing the context) locally, bypassing network elements external to the local network.

Two new additional messages have been introduced for the above purpose. The "Context Transfer" message from SGSN 305 to BSS 303 includes the required contexts that need to be transferred from SGSN 305 to BSS 303 and directs BSS 303 to enable the BSS to route traffic to the local network for the context under consideration. The "Context Transfer ACK" message from BSS 303 to SGSN 305 informs SGSN 305 that the "Context Transfer" message has been received and appropriate BSS functions have been enabled. SGSN 305, on receiving the "Context Transfer ACK" message from BSS 303, chooses the appropriate transport plane for packets that either originate or are destined to mobile station 301 or the PDP context under consideration.

Similarly, additional signaling is introduced to delete a mobile station context at a first BSS after either a "GPRS Detach" or a change in the BSS serving the mobile station. The routing function is moved from the first BSS to the second BSS. After either or these situations, the context stored at the first BSS for the detached mobile station is deleted in the first BSS. To delete a PDP context stored at SGSN 305, SGSN 305 sends a "Purge Context" message to BSS 303. BSS 303, on deleting the appropriate PDP context, responds with a "Purge Context Ack" message. Similarly, a PDP context can be modified by SGSN 305 by sending a "Modify Context" message to BSS 303. BSS 303, on modifying the appropriate PDP context, responds with a "Modify Context Ack" message. This process is described in more detail in FIG. 7 below.

The context information and messages referred to herein enables the routing function to be move between the GSN and the BSS. The use of the context information, for the purposes of moving the routing function, is described in detailed in the following text.

In the preferred embodiment, BSS 303 processes only end-to-end user data, while all control PDUs are forwarded to SGSN 305 as before. Control PDUs relate to mobility management and other control information associated with a service request or a mobile station. BSSGP 309 passes all L3MM packets up to SGSN 305. A special bit is set to indicate that BSSGP 309 does not contain SNDCP/LLC frames and that the contents of BSSGP 309 should be routed directly to the session handler in SGSN 305. This is similar to a situation where the contents of BSSGP 309 have been received from a local SNDCP layer. SGSN 305 forwards any Layer 3 PDUs received for mobile station 301 that has had the context of the mobile station has been downloaded to BSS 303, preferably using BSSGP 309.

BSS 303 listens to all uplink RLC/MAC frames generated by the PCU and performs multiple functions. BSS 303 forwards Uplink PDUs from mobile stations for which no downloaded context exists in BSS 303 to SGSN 305. BSS 303 also, upon receiving uplink PDUs from an MS that has had its context downloaded to BSS 303, recovers the complete layer 3 frame. Having extracted the LLC frame from the layer 3 frame, BSS 303 determines the destination address of the packet.

If BSS 303 has a downloaded context, then both remote units are part of the same local network, and the packet is headed to another mobile station being served by BSS 303. In this case, BSS 303 forwards (or routes) the packet to the appropriate mobile station without routing the packet to the GPRS Packet Support Nodes. In all other cases, the packet is forwarded to the local network. The capabilities of the wire line network are relied upon to route data packets from the BSS to the appropriate host on the wire line network. The routing procedures route the packet to either the final destination in the local network or to a Gateway which will then forward the packet to the appropriate gateway.

The above procedure can be enhanced by allowing BSS 303 to route packets from a mobile station that belongs to the local network to an appropriate GGSN 307, via SGSN 305, depending on the destination address or MS declared preferences. If a mobile station has more than one active service request, data from one service request can be forwarded to the corporate Intranet (local network) by BSS 303, while the other service requests have their data routed to SGSN 305. In this manner, mobile station 301 can access services located at the local network while still maintaining access to services provided via SGSN 305.

FIG. 9 depicts the contexts maintained by an SGSN for each associated mobile station. IMSI field 901 is the main reference key. MM State field 951 represents the Mobility management state. The MM State 951 may be either IDLE, STANDBY, or READY. VLR Address field 952 represents the SS7 address of the MSC/VLR currently serving this mobile station. New SGSN Address field 953 is the IP address of the new SGSN where buffered and not sent N-PDUs should be forwarded to. TLLI field 902 represents the Temporary Logical Link Identity. Routing Area field 954 is the current routing area. Cell Identity field 903 represents the current cell. Cell identity field 903 is preferably only valid when in the READY state. Authentication Triplets field 904 represent authentication and ciphering parameters. Kc field 905 represents the currently used ciphering key. CKSN field 906 represents the ciphering key sequence number of Kc 905. Ciphering algorithm field 907 represents the selected ciphering algorithm. MS Class 908 represents the GPRS MS class. The GPRS MS classes are either A, B, or C. Class mark field 909 represents the MS class mark. DRX Parameters field 910 represents discontinuous reception parameters. Compression field 911 represents negotiated data compression parameters. There are one set of parameters per QoS priority level. MNRF field 955 indicates whether activity from the mobile station should be reported to the HLR. Recovery field 956 indicates if the HLR or the VLR is performing database recovery.

Each MM context can also include a PDP context 900. PDP context 900 is a context associated with a particular PDP identifier. PDP context 900 includes the following fields. PDP Type field 912 represents the PDP type, such as X.25 or IP. PDP Address field 913 represents the PDP address, such as an X.121 address. NSAPI field 914 represents the Network layer Service Access Point Identifier. NSAPI is also a PDP context index. PDP State field 915 represents the packet data protocol state. The packet data protocol states are INACTIVE or ACTIVE. GGSN Address field 916 represents the DNS-type GSN name of the GGSN providing the Gi reference point for this PDP Address. GGSN Address in Use field 917 represents the IP address of the GGSN currently used by the activated PDP context. Dynamic Address Allowed field 957 specifies whether the mobile station is allowed to use a dynamic address. VPLMN Address Allowed field 958 specifies whether the mobile station is allowed to use a dynamic address allocated in the VPLMN. QoS Subscribed field 918 represents the quality of service subscribed for this PDP context and includes four levels.

The four levels refer to the four different Quality of Service (QoS) classes that provide different delay and other call characteristics. QoS Requested field 919 represents the quality of service requested upon PDP Context Activation and includes four levels. QoS Negotiated field 920 represents the quality of service negotiated for this PDP context and includes four levels. SND field 921 represents the GTP sequence number of the next downlink N-PDU to be sent to the mobile station, only for connection-oriented PDP types. SNU field 922 represents the GTP sequence number of the next uplink N-PDU to be sent to the GGSN, only for connection-oriented PDP types. Reordering Required field 923 specifies whether the SGSN shall reorder N-PDUs before delivering the N-PDUs to the MS.

Predetermined fields represented in FIG. 9 are also maintained at the BSS. These fields are explicitly communicated to the BSS by the SGSN. The fields in this predetermined set are IMSI field 901, TLLI field 902, Cell Identity field 903, Authentication Triplets field 904, Kc field 905, CKSN field 906, Ciphering algorithm field 907, MS Class 908, Class mark field 909, DRX Parameters field 910, Compression field 911, PDP Type field 912, PDP Address field 913, NSAPI field 914, PDP State field 915, GGSN Address field 916, GGSN Address in Use field 917, QoS Subscribed field 918, QoS Requested field 919, QoS Negotiated field 920, SND field 921, SNU field 922, and Reordering Required field 923.

Figure 4:
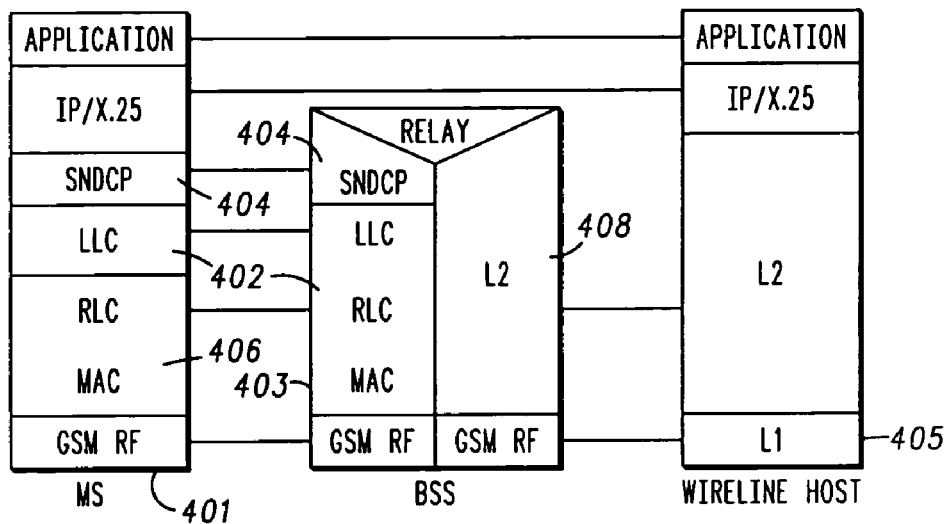
FIG. 4 depicts a protocol stack for a local mobile station to local wire line communication in accordance with the preferred embodiment of the present invention.

FIG. 4 depicts a local mobile station 401 to local wire line 401 communication. The preferred embodiment assumes that the second network is an IP-based network. LLC protocol 402 and SNDCP protocol 404 running at BSS 403 use the filtered RLC/MAC PDUs 406 to recover the transmitted network layer protocol data units (PDUs), such as IP packets. The network layer PDUs are then forwarded to the appropriate hosts on the wire line or wireless network. On receiving a context for mobile station 401 from the SGSN, BSS 403 generates a gratuitous Address Resolution Protocol (ARP) packet with its Layer 2 address 408 in the Layer 2 address field in the ARP packet. In IP networks, ARP packets refer to the packets generated by Address Resolution Protocol that is needed to create the mapping between Layer 3 (Network Layer) and Layer 2 (MAC) addresses. The ARP packet is a broadcast packet. The gratuitous APP packet is transmitted only on the wire line network. Further, BSS 403 also responds to the ARP requests directed towards mobile stations for which BSS 403 has a context. Therefore, any packets addressed to a mobile station that are currently associated with BSS 403 are routed to BSS 403. Layer 3 frames destined for mobile station 401 are routed by default to the corporate gateway, unless BSS 403 advertises its ability to deliver packets to mobile station 401.

In the situation when a mobile station moves out of the area served by a BSS, the contexts for that mobile station are removed at the BSS, preferably under the direction of the SGSN. The BSS then initiates procedures to ensure that data generated by users on the local network for the mobile station is routed to the corporate gateway.

Figure 5:
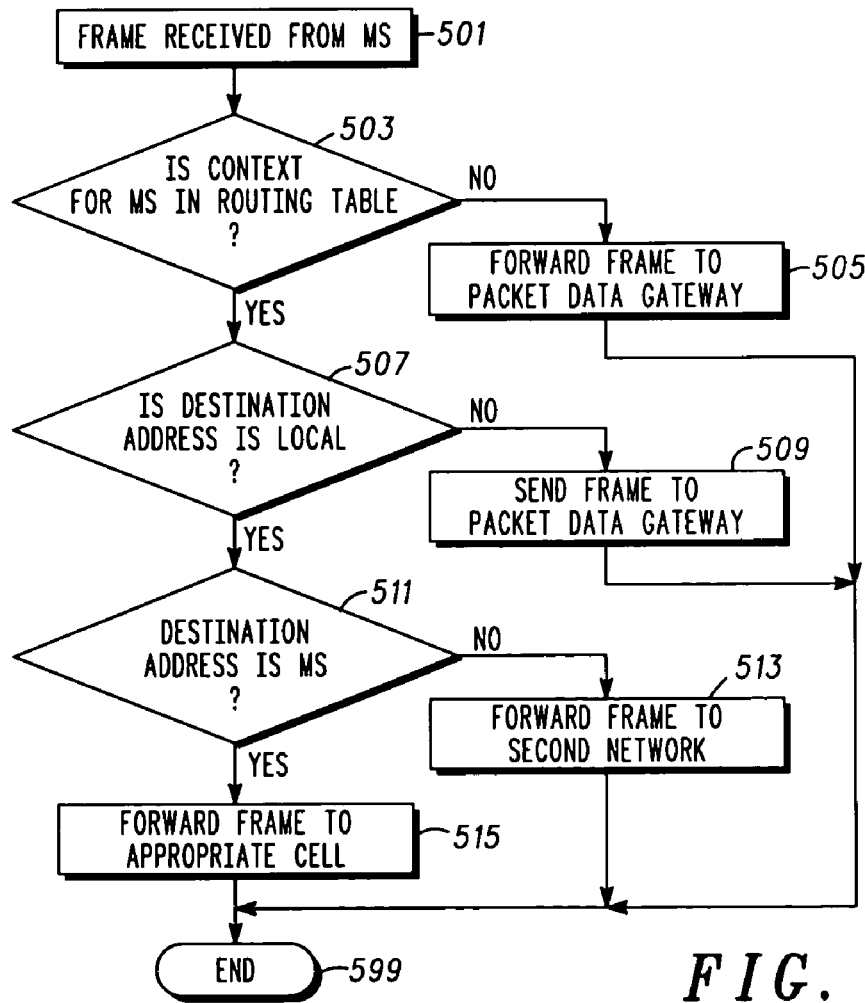
FIG. 5 depicts a flow diagram for routing packets from mobile station hosts to wire line hosts in accordance with the preferred embodiment of the present invention.

FIG. 5 depicts a flow chart for representing the routing of packets from a mobile host to a wire line host. A frame is received (501) from a mobile station. The BSS determines (503) whether the downloaded context for the mobile station is in the routing table. If the downloaded context is not in the routing table, the BSS forwards (505) the frame to the Packet Data Gateway. The process then ends (599). The Packet Data Gateway forwards the frame to the appropriate packet data gateway. If the downloaded context for the mobile station is in the routing table, the BSS determines (507) if the destination address is local. If the address is not local, the BSS sends (509) the frame to the Packet Data Gateway. The process then ends (599). If the destination address is local, the BSS determines (511) if the destination address is for a mobile station. If the frame is not for a mobile station, the BSS forwards (513) the frame to a second network. If the frame is for a mobile station, the BSS forwards (515) the frame to the appropriate cell. The appropriate cell is the cell where the destination mobile station is currently affiliated. The process then ends (599).

Figure 6:
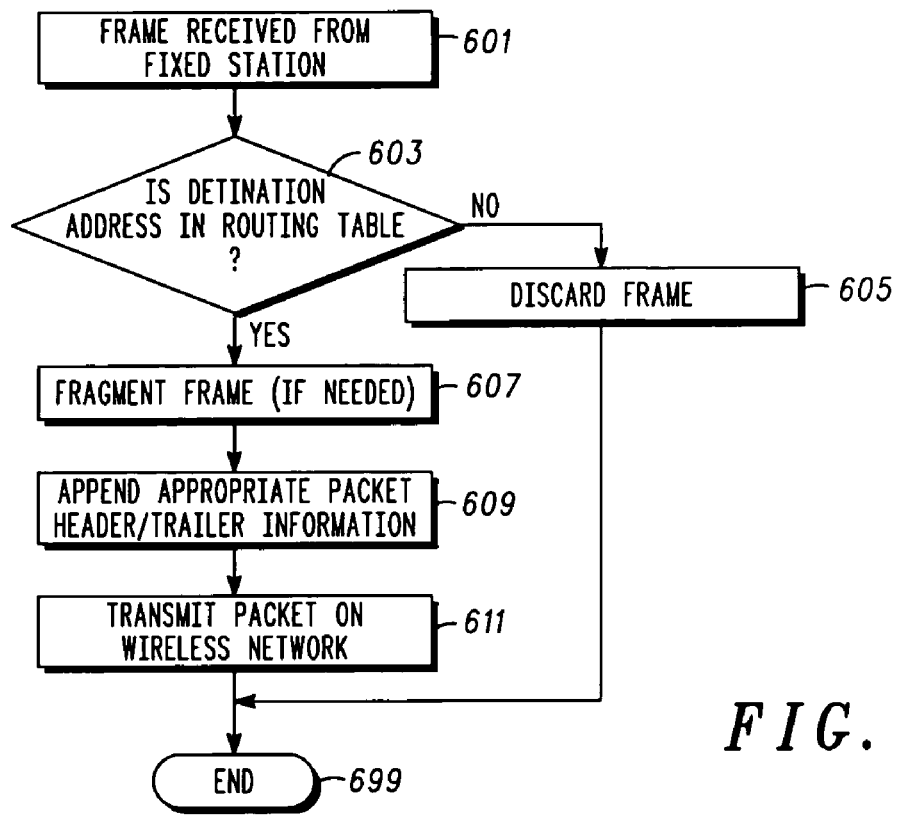
FIG. 6 depicts a flow diagram for routing data packets from wire line hosts to mobile stations in accordance with the preferred embodiment of the present invention.

FIG. 6 depicts a flow chart for representing the routing of packets from a wire line host to a mobile station. A frame is received (601), preferably by a BSS, from a fixed station. The BSS determines (603) whether the destination address is in the routing table. The routing table is a table located at the BSS that includes all the downloaded contexts. If the destination address is not in the routing table, the BSS discards (605) the frame. The process then ends (699). If the destination address is in the routing table, the BSS fragments (607) the frame, if necessary. The BSS then appends 609) appropriate packet header and trailer information to the packet. The BSS then transmits (611) the packet on the wireless network. The process then ends (699).

Figure 7:
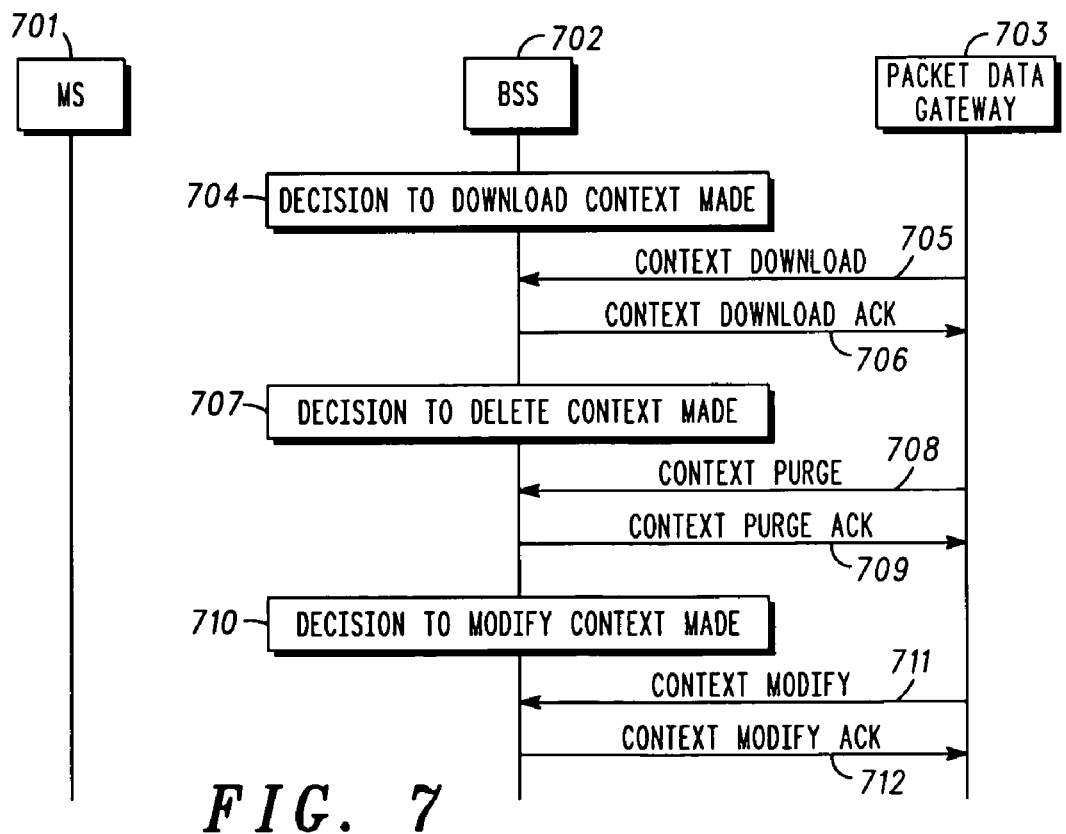
FIG. 7 depicts a call flow diagram for a mobile station, BSS, and packet data gateway communication in accordance with the preferred embodiment of the present invention.

FIG. 7 illustrates the call flow diagrams for various scenarios covered by the present invention. A decision (704) to download a context is made. The context preferably is associated with a mobile station 701. In an alternate embodiment, the context is related to a mobile user of a mobile station. The Packet Data Gateway 703 downloads the context 705 to BSS 702. BSS 702 sends a context download Ack 706 to indicate that the context has been successfully downloaded to BSS 702.

In addition to downloading the context, the context can be deleted or modified. When a decision (707) is made to delete a context at BSS 702, a context purge message 708 is sent from Packet Data Gateway 703 to BSS 702. Upon deleting the context, BSS 702 send a context purge Ack 709 to indicate that the context has been successfully deleted from BSS 702.

When a decision (710) is made to modify a context, Packet Data Gateway 703 send a context modify message 711 to BSS 702. Upon modifying the context, BSS 702 send a context modify Ack 712 to indicate to Packet Data Gateway 703 that the context has been successfully modified.

The present invention provides Local Routing of Circuit Switched data for in-building applications by utilizing the GPRS access method for Local Routing of Circuit Switched data. The use of GPRS for access to Circuit Switched services enables the in-building system to offer mobile users access to circuit switched services. As a result, access to an Inter Working Function (IWF) at the MSC is not required. No MSC interaction is required for access to circuit switched services.

The present invention provides for routing a service request to access a circuit switched service to a packet data gateway in a communication system. The method comprises the steps of receiving a circuit switched service request at a Base Station System (BSS). The circuit switched service request includes data. A context is transferred from a packet data gateway to the BSS. The data from the circuit switched service request is routed, based at least in part upon the context.

Figure 8:
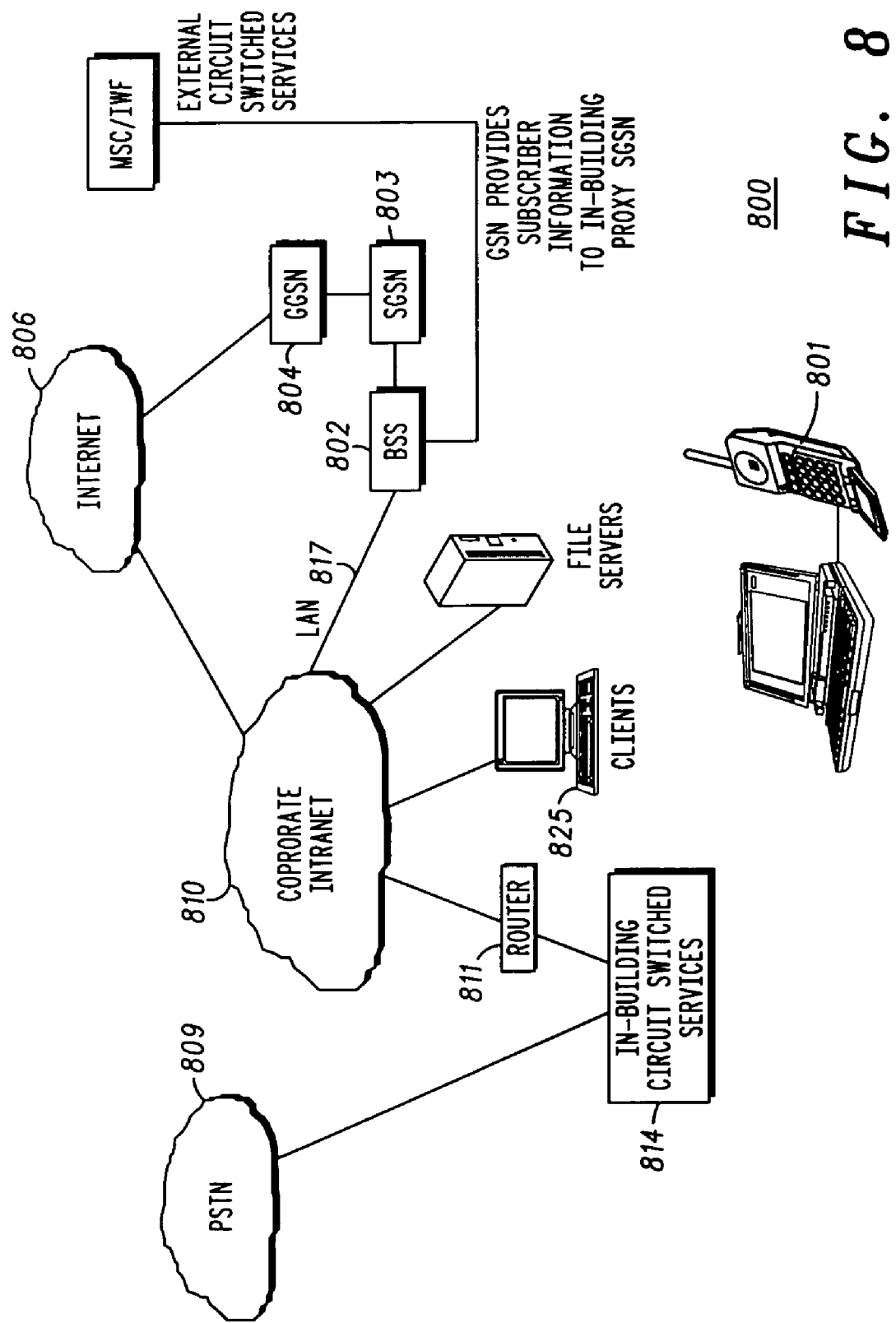
FIG. 8 depicts a communication network in accordance with the preferred embodiment of the present invention.

Circuit Switched data services are provided by using data modems and fax modems attached to a Local Area Network (LAN) via a router, as depicted by communication system 800 in FIG. 8. Router 811, data modems and fax modems 814 are off-the-shelf items that are commonly used today in corporate LAN modem pools. For additional user convenience, Fax Servers 814 can be LAN accessible so that mobile user 801 does not need to be connected when a fax is actually being sent to or received from PSTN 809. LAN accessible Circuit Switched facilities can be connected to the in-building PBX and to PSTN 809 for public network access.

In an alternate embodiment of the present invention Local Routing for Public GPRS Networks, such as might be found in shopping malls or train stations, is provided. In this embodiment, mobile stations may not be required to be pre-registered at an SGSN in order for them to take advantage of Local Routing. In this embodiment, additional signaling occurs between the mobile station and the SGSN. The proposed signaling will enable the SGSN to advertise the possibility of local routing to access certain local resources to the MS. In addition, the mobile station can query the SGSN about the local routing capability and the services that can be accessed before its context is downloaded to a BSS. Further, the mobile station can indicate to the SGSN that it wishes to download its context to a BSS.

Once it has been negotiated between the mobile station and the SGSN that the context associated with the mobile station should be downloaded to a BSS, the method previously described is invoked to complete the context download from the SGSN to the BSS.

Returning to FIG. 8, in current communication systems, data packets between a GPRS mobile station 801 and a wire line host traverse through a BSS 802 to a Serving GPRS Support Node (SGSN) 803. SGSN 803 typically forwards the data packets through GGSN 804. GGSN 804 will forward the data packets through another GGSN or an Internet Gateway 806. Corporate network 810 then forwards the packet to an appropriate host. GGSN 804 then routes the packets within an external network to a second GGSN (not shown). The second GGSN is associated with a destination mobile station. In this embodiment, mobile station 801 is treated like a fixed network host. Consequently, no special handling is required to route packets between two mobile stations.

The present invention provides local routing of data between mobile stations. In the preferred embodiment of the present invention, an in-building local network 810 is connected directly to a pico-cellular GPRS BSS system 802 through LAN 817. Packets transmitted to and from wire line hosts in local network 810 and wireless hosts are routed by serving BSS 802 without intervention from SGSN 803, except when the service request is first placed. Serving BSS 802 is attached to local network 810. Wireless hosts are treated as being a part of local network 810. Similarly, data packets between two wireless hosts served by the same BSS could be switched by the BSS.

To facilitate local routing, SGSN 803 transfers a context, or a portion thereof, associated with a service request to BSS 802. In the preferred embodiment, the step of transferring a context is initiated by mobile station 801 in communication with BSS 802. The step of transferring a context is initiated by mobile station 801 upon power up of mobile station 801. In an alternate embodiment, the step of transferring a context is initiated by the mobile station upon reselection of a cell, such as when roaming. In this alternate embodiment, the method further comprising the step of deleting the context at the first BSS that the mobile station has just left.

In an alternate embodiment, local routing of data between wire line stations and mobile station 801 is facilitated by mobile station 801 directing SGSN 803 to transfer the context associated with mobile station 801 to BSS 802. The mobile thereby directs the routing function to be moved from the SGSN to the BSS. The mobile may perform this request upon reselection of a cell.

The context can also be deleted at BSS 802. A context is transferred from a packet data gateway to BSS 802, such as when mobile station 801 powers up. Upon receiving an event, the context is deleted at BSS 802. In a preferred embodiment, the event is the powering off of mobile station 801 that is in communication with BSS 802. Upon power off of mobile station 801, the context for mobile station 801 is deleted. In an alternate embodiment, the event is the expiration of an inactivity timer. The inactivity timer is set when a mobile user ceases activity. Upon the expiration of the timer, such as when the mobile station has not engaged in any communication activity for a predetermined period of time, the context for the mobile station is deleted at BSS 802. When a context is deleted at the BSS, the local routing function at the BSS for that mobile station can also be deleted.

In a further alternate embodiment, the event is a message sent from the mobile station to the BSS for the context to be deleted at the BSS. This could occur when the mobile station wants to remain on-line but does not want to be contacted by other users. This embodiment provides flexibility and convenience to the mobile user. In addition, the mobile station and the packet data gateway can negotiate to determine who should inform the BSS when the context for the mobile station should be deleted at the BSS.

The Packet Data Gateway can send a message to the BSS in order to return the local routing function from a BSS to the GSN when a subscriber moves out of the local routing area or if there is a context modification.

In the preferred embodiment, Local Routing of data between wire line stations 825 and mobile stations 801 is facilitated by pre-registering a set of mobile stations belonging to local network 810 with SGSN 803. This is preferably accomplished through the allocation of specific IMSIs.

The additional functionality of the present invention can be implemented in software using a standard hardware/software platform. Further, the present invention utilizes existing GPRS protocol stacks, thereby reducing the development effort.

It should be understood that a mobile station refers to a physical mobile unit, such as a cellular telephone, that may be used by multiple and varied users. A mobile user refers to a user of a mobile station. A mobile user may utilize a mobile station by inserting an identification element, such as a smart card or the like, into the mobile station to identify the mobile user and provide access and privilege information, as well as information relating to billing accounts, place of work, and other elements which particularly identify the user and set forth the access privileges and capabilities of the mobile user while utilizing the mobile station. It should further be understood that the present invention works in relation to a mobile station, and also in relation to a mobile user. For instance, the context of a physical mobile station can be utilized to determine the routing of data coming to and from that particular mobile station. Alternately, the routing of data can be determined by utilizing the context of a mobile user. In this manner, a mobile user can physically use different mobile stations at different times, and still have the same access privileges across the varied mobile stations. The present invention provides the BSS with the control path to the SGSN so that billing information and statistics information, pertaining to the BSS local routing, can be transferred to the SGSN.

The present invention of Local Routing of GPRS data provides many advantages over the prior art. The present invention provides a seamless extension of the wire line local network to the wireless domain. In addition, the present invention provides reduced end-to-end delay since data between mobile stations and wire line hosts is optimally routed. Further the present invention provides reduced leased line costs since in-building traffic does not leave the premises. Still further, the present invention provides reduced traffic handling capacity required for the corporate wire line gateway and the SGSN, thereby ensuring increased system scalability.

While this invention has been described in terms of certain examples thereof, it is not intended that it be limited to the above description, but rather only to the extent set forth in the claims that follow.

We claim:

1. A method for routing data in a communication system, the method comprising the steps of:
   determining that a first remote unit needs to communicate with a second remote unit, wherein the first remote unit is a mobile unit;
   determining an availability of the second remote unit within a local network, wherein the first remote unit is part of the local network;
   transferring a routing function from a packet data gateway to a Base Station System, based on the determination that the second remote unit is within the local network so that data can be routed from the first remote unit to the second remote unit via the BSS without routing the data through the packet data gateway, wherein transferring the routing function comprises transferring context information that comprises mobility and security information.

2. A method for routing data in a communication system in accordance with claim 1, further comprising the step transferring the routing function from the BSS to a second BSS.

3. A method for routing data in a communication system in accordance with claim 1, wherein the step of transferring the routing function is done based on a request from the first or the second remote unit.

4. A method for routing data in a communication system in accordance with claim 1, wherein the step of transferring the routing function is initiated by the first remote unit upon reselection of a cell.

5. A method for routing data in a communication system in accordance with claim 1, further comprising the step of transmitting billing and statistics from the BSS to the packet data gateway.

6. The method of claim 1 further comprising the step of returning the routing function from the BSS to the Packet Data Gateway based on a determination that the first remote unit moved outside of the local area.

7. The method of claim 1 further comprising the step of returning the routing function from the BSS to the Packet Data Gateway based on a request to do so from the Packet Data Gateway.

8. The method of claim 1 further comprising the step of returning the routing function from the BSS to the Packet Data Gateway based on a context modification.

9. The method of claim 1 further comprising the step of returning the routing function from the BSS to the Packet Data Gateway based on a length of inactivity of the first remote unit.

10. The method of claim 1 wherein the second remote unit comprises a data server providing Interconnection to a circuit-switched network.

11. The method of claim 1 wherein the step of transferring the routing function is additionally based on an identity of the second remote unit.

* * * * *